United States Patent
Startup

[19]

[11] Patent Number: 6,137,612
[45] Date of Patent: Oct. 24, 2000

[54] METHOD AND SYSTEM FOR CHANNELIZATION AND DOWN CONVERSION OF WIDEBAND SUBSCRIBER INFORMATION SIGNALS

[75] Inventor: James William Startup, Chandler, Ariz.

[73] Assignee: Motorola, Inc., Schaumburg, Ill.

[21] Appl. No.: 09/002,423

[22] Filed: Jan. 2, 1998

[51] Int. Cl.$^7$ .................................................. H04B 10/00
[52] U.S. Cl. ........................... 359/172; 359/154; 359/159
[58] Field of Search ..................................... 359/172, 154, 359/159

[56] References Cited

U.S. PATENT DOCUMENTS 4,699,466  10/1987  Brandstetter et al. ............. 350/162.12
5,105,380   4/1992  Owechko ................... 364/825
5,363,221  11/1994  Sutton et al. ............................. 359/11

*Primary Examiner*—Jason Chan
*Assistant Examiner*—M. R. Sedighian
*Attorney, Agent, or Firm*—Sherry J. Whitney; Frank J. Bogacz

[57] ABSTRACT

The invention describes a method and system for channelization through the application of a weighted chirp pulse. The impulse response of a desired filter weighting is applied to the output of a chirp pulse generator (FIG. 1, 150). The resulting weighted chirp pulse is then applied to the a first columnar Bragg cell (80) while an unweighted chirp pulse is applied to a second columnar Bragg cell (90). A modulated energy beam (55) is then allowed to pass through both Bragg cells. The resultant spatially dispersed energy beam (95) is then applied to lens (120) and projected onto a detector array (130). The detector array (130) then extracts the subscriber transmitted information from the projected interference pattern.

12 Claims, 3 Drawing Sheets

METHOD AND SYSTEM FOR CHANNELIZATION AND DOWN CONVERSION OF WIDEBAND SUBSCRIBER INFORMATION SIGNALS

FIELD OF THE INVENTION

The invention relates generally to the field of communication systems and, more particularly, to channelization and down conversion of wideband subscriber information signals.

BACKGROUND OF THE INVENTION

In a satellite communication system, subscribers can be distributed across a wide geographical area. Information transmitted from each of the subscribers is uplinked to a communication satellite where it is combined with the transmitted information from other subscribers and routed to another node of the communication system such as a ground receiving station. This information can represent analog voice, digitized voice or data, or a combination of voice and data. In a satellite communication system that is comprised of a plurality of satellites, the combined transmitted information can also be routed to another satellite through an intersatellite link. In satellite communication systems, a channelizer is useful in separating the information of a single subscriber from a combined stream of transmitted information. In such a system, the channelizer can be used in either a satellite, or a ground station.

In a communication system which is required to be lightweight and low power-consuming, an optical channelizer can be used to efficiently separate a stream of information from a single subscriber from a combined stream of information. Optical channelizers also convert the individual subscriber information channels to base band. After conversion to base band, the information can be extracted from the individual subscriber channel according to well-known techniques. An additional advantage that optical channelizers possess over other techniques of channelization and down conversion, is the capability to perform these functions on many inputs modulated over a large bandwidth.

In an optical channelizer, an optical signal is modulated and transmitted through a pair of columnar Bragg cells arranged side-by-side. The Bragg cells spatially disperse the wideband frequency information contained within the optical signal. The spatially dispersed frequency information is then transmitted through a time-domain transforming lens and projected onto a detector array. The detectors which comprise the array extract the channel information from the interference pattern through the use of well-known techniques. In a typical system, the output of each detector is then filtered to remove unwanted channel information from adjacent detectors. The additional channel information from adjacent detectors is referred to as inter-symbol interference. The filtering of the detector output to reduce the inter-symbol interference significantly increases the weight and power requirements for the optical channelizer system.

Inter-symbol interference at the detector output can also be reduced by electronically filtering the wideband information channel prior to applying the signal to the acousto-optic modulator. However, this implementation is costly and has the negative effect of distorting the wideband information channels. Additionally, this technique also adds significant weight to the optical channelizer system.

Therefore, what is needed, are a method and system for down converting and channelizing a wide band input signal and filtering each of the resulting channels.

DESCRIPTION OF THE PREFERRED EMBODIMENTS

In accordance with a preferred embodiment of the invention, an optical channelizer applies an amplitude weighted chirp pulse to the inputs of side-by-side Bragg cells, offering significant improvements over existing systems. By applying an amplitude weighted chirp pulse to the Bragg cells, the need for filtering the individual outputs of the detector array can be eliminated. Additionally, since the amplitude weighted chirp pulse is applied to the Bragg cells, in lieu of filtering the wideband input signal, the wideband input signal remains undistorted. This enables the design and construction of lightweight and low power optical channelizers which operate over a large frequency range with low inter-symbol interference. These favorable characteristics make this type of optical channelizer attractive for use in any application which could benefit from the low power, lightweight characteristics. The applications include satellites or other space vehicles, aircraft, as well as fixed or mobile ground stations.

Figure 1:
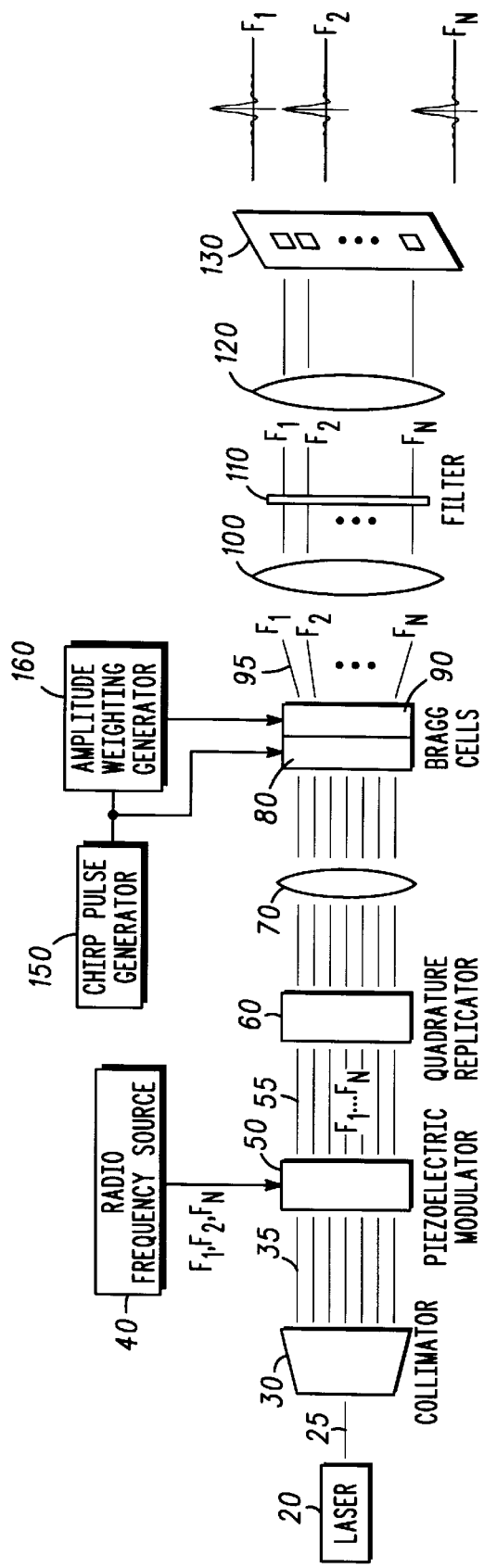
FIG. 1 illustrates a block diagram of a Bragg cell channelizer and down converter which uses an amplitude weighted chirp pulse in accordance with a preferred embodiment of the invention.

FIG. 1 illustrates a block diagram of a single input Bragg cell channelizer and down converter which uses an amplitude weighted chirp pulse in accordance with a preferred embodiment of the invention. In FIG. 1, laser 20 produces phase coherent energy beam 25. Although phase coherent energy beam 25 is shown as emanating from laser 20, this is not intended to be limiting in any way. Laser 20 can be substituted by any other source of phase coherent radiated energy. Thus, phase coherent energy beam 25 is not limited to radiation at optical or infrared wavelengths. It is desirable that phase coherent energy beam 25 be comprised of extremely high frequency energy; however, the present method and system can be effected using any type of phase coherent radiated energy.

Collimator 30 receives phase coherent energy beam 25 and ensures that the radiated energy is formed into a substantially straight line. Thus, the effect of collimator 30 is to transform phase coherent energy beam 25 into collimated phase coherent energy beam 35. Collimator 30 can be of any type. However, collimator 30 should be designed to operate at the frequency band of phase coherent energy beam 25. In a preferred embodiment, collimator 30 may comprise a set of optical mirrors which serve to cause phase coherent energy beam 25 to move in a single direction. Collimator 30 may be comprised of other components in the event that phase coherent energy beam 25 is comprised of radiated energy which is outside the optical or infrared spectrum.

Collimated phase coherent energy beam 35 is then incident on piezoelectric modulator 50. Additionally incident on piezoelectric modulator 50 are wideband frequency signals from radio frequency source 40. Radio frequency source 40 generates a plurality of frequencies, or channels ($F_1$ through $F_N$), with each channel comprising subscriber transmitted information. For example, radio frequency source 40 may contain four-hundred different channels spread over a 10 MHz frequency band, with each channel consuming twenty-five KHz of bandwidth. A greater or lesser number of channels could be produced by radio frequency source 40 within a variety of frequency bands.

Piezoelectric modulator 50 imparts the wideband channel information from radio frequency source 40 to collimated phase coherent energy beam 35. Piezoelectric modulator 50 modulates collimated phase coherent energy beam 35 by way of the compression and rarefaction of the piezoelectric material which comprises piezoelectric modulator 50. The compression and rarefaction of piezoelectric modulator 50 has the effect of altering the phase of collimated phase coherent energy beam 35 according to the information present in the wideband frequency signals from radio frequency source 40.

The resulting modulated energy beam 55 is then incident on quadrature replicator 60. The effect of quadrature replicator 60 is to replicate modulated energy beam 55 at 90, 180, and 270 degree offsets. The resulting phase shifted modulated energy beam is then comprised of original modulated energy beam 55 as well as versions of modulated energy beam 55 which are phase shifted by 90, 180, and 270 degrees. As is well known in the art, the presence of phase shifted energy beam components provide negative frequencies. These negative frequency components simplify the conversion of the output of transforming lens 120 into time domain information by detector array 130, which will be discussed later. In a preferred embodiment of the invention, quadrature replicator 60 is included in order to preclude the need for additional signal conditioning at the output of detector array 130. However, in an alternate embodiment of the present invention, quadrature replicator 60 may not be needed.

The output of quadrature replicator 60 is then incident on focusing lens 70. Focusing lens 70 serves to bring the output of quadrature replicator 60 into focus so that the maximum amount of energy will be incident on first Bragg cell 80. Focusing lens 70 can be of any type, however, it is desirable that it possess the capability to focus the output of quadrature replicator 60 onto first Bragg cell 80 without significant distortion. If phase shifted versions of modulated energy beam 55 are also present, then focusing lens 70 should be capable of focusing these as well.

Also incident on first Bragg cell 80 is a chirp pulse from chirp pulse generator 150 and amplitude weighting generator 160. In a preferred embodiment, chirp pulse generator 150 generates a carrier or sinusoidal wave which increases in frequency throughout the duration of the pulse. In an alternate embodiment, chirp pulse generator 150 generates a chirp pulse which decreases in frequency throughout the duration of the pulse. In another alternate embodiment, chirp pulse generator 150 generates a chirp pulse that linearly increases or decreases in frequency during a portion of the pulse width and remains at a constant frequency during another portion of the pulse width. Other phase coherent chirp pulses can also be generated by chirp pulse generator 150.

It is desired that chirp pulse generator 150 is capable of generating a chirp pulse waveform of sufficient amplitude to compress and rarefy first Bragg cell 80 and second Bragg cell 90 without significant distortion. Another desired attribute of chirp pulse generator 150 is that it generate time-contiguous chirp pulses where the difference between the highest and lowest frequency is at least large as the bandwidth of wideband frequency signal from radio frequency source 40.

The output of chirp pulse generator 150 is fed to amplitude weighting generator 160. Amplitude weighting generator 160 multiplies the desired filter weighting to the output of chirp pulse generator 150. The resulting weighted chirp pulse is then coupled to the top portion of second Bragg cell 90. A second output of chirp pulse generator 150 without weighting is coupled to first Bragg cell 80. As modulated energy beam 55 passes through first Bragg cell 80 and second Bragg cell 90, the weighted and unweighted chirp pulses down convert and spatially disperse the frequency information contained within modulated energy beam 55.

In a preferred embodiment, amplitude weighting generator 160 has the effect of applying the impulse response of a root raised cosine response. Other applications may dictate that other filtering responses, such as a Gaussian filter, be used in order to satisfy unique system requirements. Additionally, the amplitude weighting function can be a composite of two or more discrete filtering techniques as needed for use with a particular application.

As modulated energy beam 55 traverses through first Bragg cell 80 and second Bragg cell 90, it is modulated by the chirp signal present in each Bragg cell. The resulting energy from second Bragg cell 90 is spatially dispersed according to the frequency of the individual channel from radio frequency source 40. As shown in FIG. 1, channel $F_1$ emanates from the top portion of second Bragg cell 90. Channel $F_2$ emanates from a slightly lower portion of second Bragg cell 90. The highest frequency channel, denoted by $F_N$, emanates from the bottom portion of second Bragg cell 90. This spatial dispersion of frequency channels is the basic Bragg cell mechanism for frequency down conversion and channelization.

The resulting energy beam 95 is then incident on focusing lens 100. Focusing lens 100 serves to focus spatially dispersed energy beam 95 from second Bragg cell 90 so that further processing can be performed as described herein. Spatially dispersed energy beam 95 is then filtered through optical filter 110. The role of optical filter 110 is to ensure that any stray reflected or refracted components do not further propagate into the optical channelizer assembly.

After optical filter 110, spatially dispersed energy beam 95 is then transmitted through transforming lens 120. Transforming lens 120 brings about an interference pattern representative of the frequency channel information contained in spatially dispersed energy beam 95 and projects this onto detector array 130. The interference patterns corresponding to each of the channels can then be detected by the detectors which comprise detector array 130 and integrated in the time domain through well-known means without further filtering.

In a preferred embodiment, transforming lens 120 brings about an interference pattern on detector array 130 which enables a transformation to the time domain by way of a Fourier transform. However, any lens which performs a function that enables a conversion of signal information from the frequency domain to the time domain according to another integral transform can also be used. The subscriber transmitted information can then be extracted from the time domain function according to well-known techniques.

Although FIG. 1 shows a single piezoelectric modulator 50, more can be used if desired by the application. In this case, additional quadrature replicators such as quadrature replicator 60 can be used, as well as additional focusing lenses such as focusing lens 70 can be used. Further, Bragg cell 80 should possess more than one input in order to accept the outputs from focusing lens 70.

Figure 2:
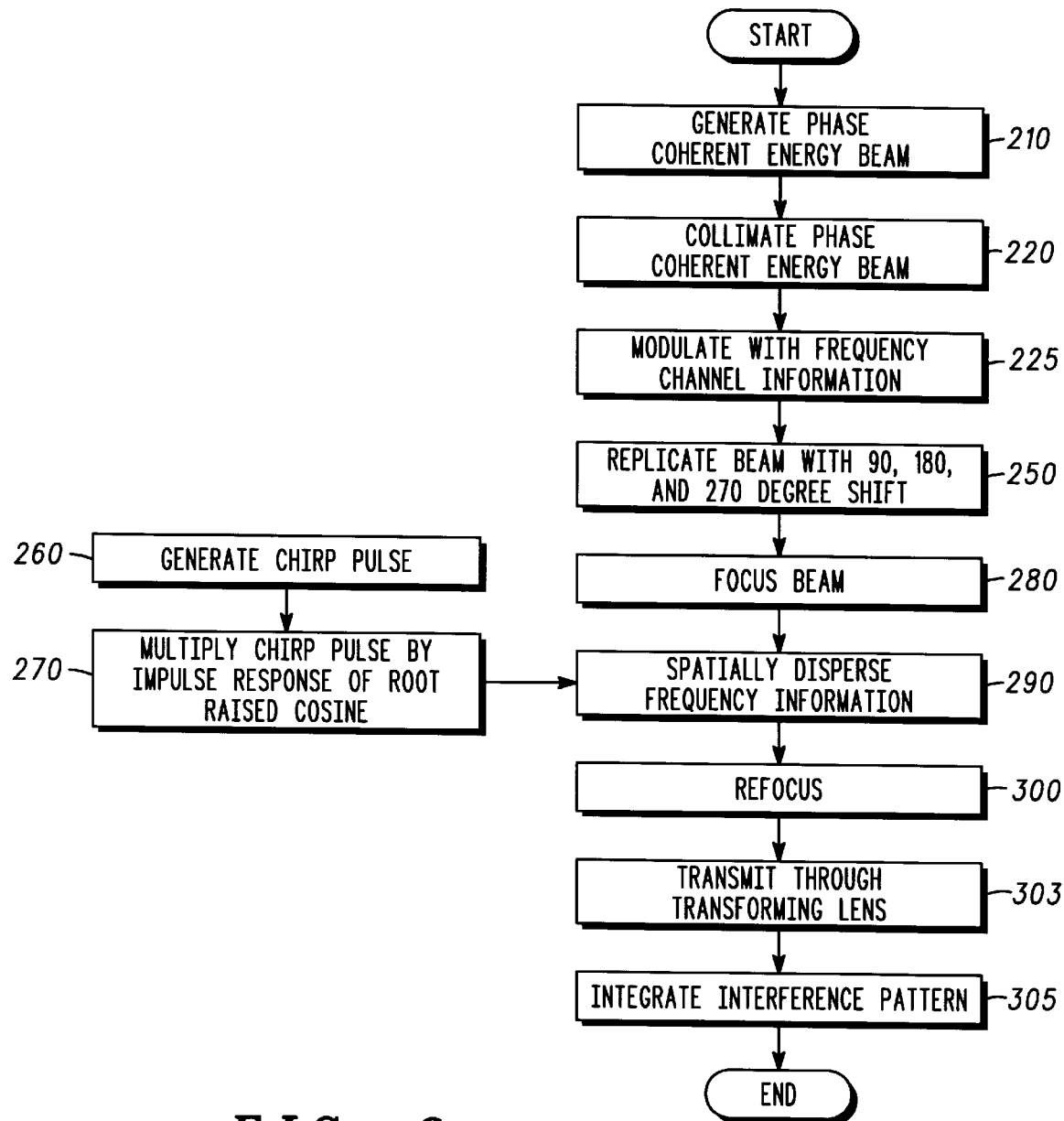
FIG. 2 illustrates a flowchart of a detailed method for Bragg cell optical channelization and down conversion using an amplitude weighted chirp pulse in accordance with a preferred embodiment of the invention.

FIG. 2 illustrates a flowchart of a detailed method for Bragg cell optical channelization and down conversion using an amplitude weighted chirp pulse in accordance with a preferred embodiment of the invention. In step 210, a phase coherent energy beam is generated by an appropriate source. The phase coherent energy beam is then collimated in step 220. The resulting collimated phase coherent energy beam is then modulated with the frequency channel information from the individual subscribers in step 225. In step 250, the modulated energy source is replicated. At the output of step 250, the replicated energy beams, now offset by 0, 90, 180 and 270 degrees, are focused in step 280.

In step 260, a chirp pulse is generated and multiplied by the desired filter weighting of the root raised cosine in step 270. In step 290, the frequency information is spatially dispersed according to the frequency of each of the subscriber information channels modulated in step 225. In step 300, the spatially dispersed frequency information is refocused and transmitted through a transforming lens in step 303. In step 305, the resulting interference patterns are integrated in the time domain by the detector elements which comprise a detector array.

Figure 3:
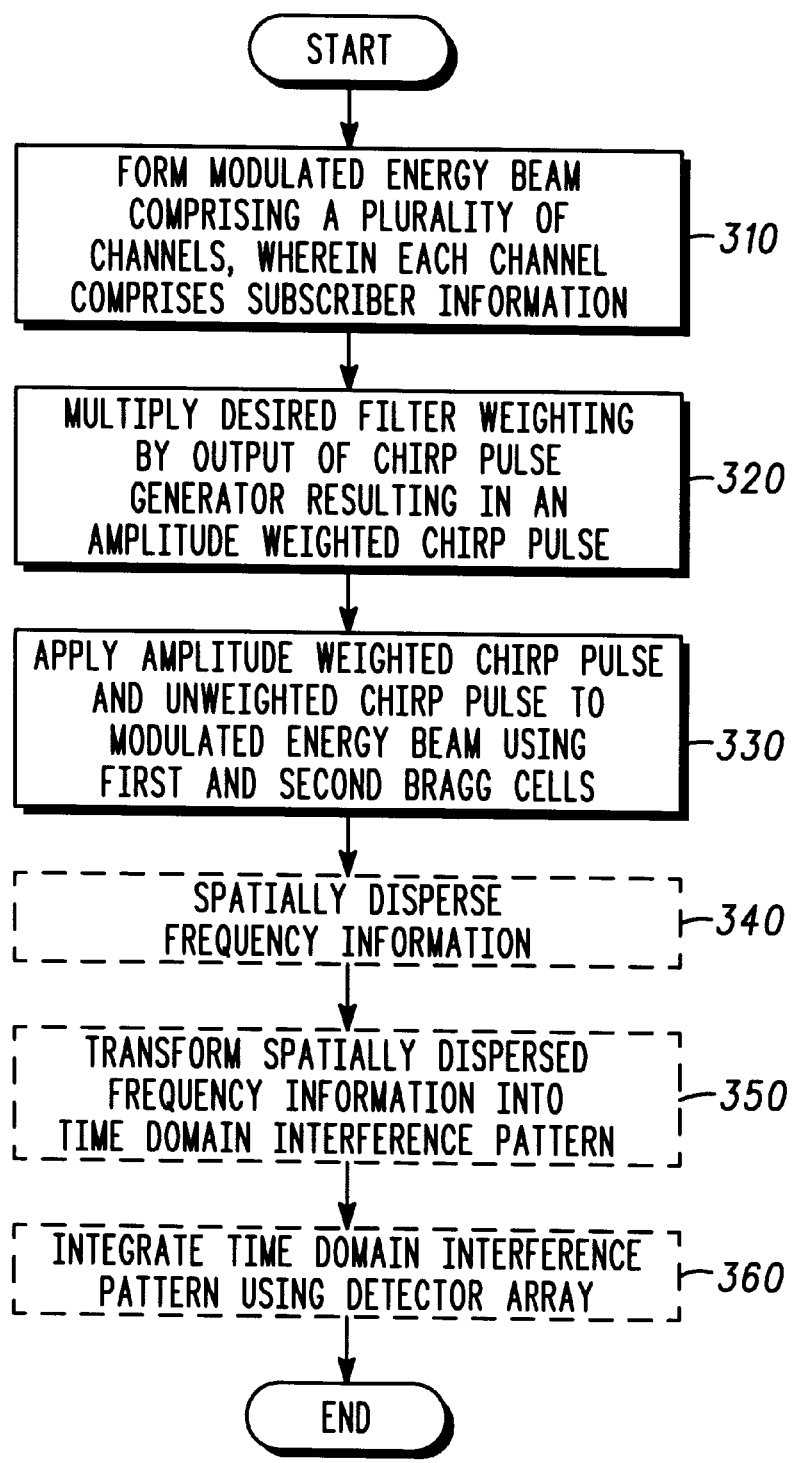
FIG. 3 illustrates a flowchart of a method for Bragg cell optical channelization and down conversion using an amplitude weighted chirp pulse in accordance with a preferred embodiment of the invention.

FIG. 3 illustrates a flowchart of a method for Bragg cell optical channelization and down conversion using an amplitude weighted chirp pulse in accordance with a preferred embodiment of the invention. In step 310, a modulated energy beam comprising a plurality of channels, wherein each channel comprises subscriber information, is formed by an appropriate source. In step 320, a desired filter weighting is multiplied by an output of a chirp pulse generator resulting in an amplitude weighted chirp pulse. In step 330 the amplitude weighted chirp pulse and the unweighted chirp pulse are applied to the modulated energy beam using a first and second Bragg Cell.

In accordance with a preferred embodiment, the method can further comprise the additional step of spatially dispersing frequency information from the modulated energy beam, as in step 340. The method can also comprise the step of transforming the spatially dispersed frequency information using a lens which transforms frequency information into a time domain interference pattern as in step 350. The method can further comprise step 360 of integrating the time domain interference pattern using a detector array.

An optical channelizer which applies an amplitude weighted chirp pulse to the input of a Bragg cell modulator offers significant improvements over existing systems. By applying an amplitude weighted chirp pulse to the Bragg cell modulator, the need for filtering of the individual outputs of the detector array can be eliminated. Additionally, since an amplitude weighted chirp pulse is applied to the Bragg cell modulator in lieu of filtering the wideband input signal, remains undistorted. These favorable characteristics make this type of optical channelizer attractive for use in any application which could benefit from the low power, light-weight characteristics. The applications include satellites or other space vehicles, aircraft, as well as fixed or mobile ground stations.

Accordingly, it is intended by the appended claims to cover all modifications of the method and system of the present invention that fall within the true spirit and scope of the invention.

What is claimed is:

1. A method for downconverting and channelizing a modulated energy beam, the modulated energy beam comprising a plurality of channels, wherein each channel comprises subscriber information, the method comprising:

generating a chirp pulse by a chirp pulse generator;

multiplying an amplitude weighting by the chirp pulse resulting in an amplitude weighted chirp pulse;

applying the chirp pulse to a first Bragg cell to produce a first output;

transmitting said first output to a second Bragg cell, said second Bragg cell coupled to said first Bragg cell;

applying the amplitude weighted chirp pulse to the first output using said second Bragg cell; and producing by said second Bragg cell a spatially dispersed energy beam version of the modulated energy beam.

2. The method recited in claim 1, wherein the modulated energy beam is comprised of radiation at optical wavelengths.

3. The method recited in claim 1, wherein the modulated energy beam is comprised of radiation at infrared wavelengths.

4. The method recited in claim 1, wherein the method further comprises the step of spatially dispersing frequency information from the modulated energy beam resulting in a spatially dispersed energy beam.

5. The method recited in claim 4, wherein the method further comprises the step of transforming the spatially dispersed energy beam using a lens which transforms frequency information into a time domain interference pattern.

6. The method recited in claim 5, wherein the lens is Fourier lens.

7. The method recited in claim 5, wherein the method further comprises the step of integrating the time domain interference pattern using detector array.

8. An optical channelizer and down converter system, wherein the optical channelizer and down converter system channelizes and filters a modulated energy beam, the modulated energy beam comprising a plurality of channels, the system comprising:

a chirp pulse generator for generating a chirp pulse;

an amplitude weighting generator which multiplies an amplitude weighting by the chirp pulse resulting in an amplitude weighted chirp pulse, said amplitude weighting generator coupled to said chirp pulse generator;

a first Bragg cell for receiving the modulated energy beam and producing a first output, said first Bragg cell coupled to said chirp pulse generator; and a second Bragg cell for receiving said first output and for receiving said amplitude weighted chirp pulse, said second Bragg cell for producing a second output being a spatially dispersed energy beam version of said modulated energy beam, said second Bragg cell coupled to said first Bragg cell and to said amplitude weighting generator.

9. The optical channelizer and down converter system as claimed in claim 8, wherein the system additionally comprises a lens which brings about an interference pattern representative of frequency information contained in the spatially dispersed energy beam.

10. The optical channelizer and down converter system as claimed in claim 8, wherein the system additionally comprises a detector array which extracts time domain information from the interference pattern.

11. The optical channelizer and down converter system as claimed in claim 8, wherein the system comprises a satellite space vehicle.

12. The optical channelizer and down converter system as claimed in claim 8, wherein the optical channelizer and down converter system comprises a ground station.

* * * * *